INVENTOR.
AMADEO FERRE DOMINGO

April 12, 1966 A. FERRE DOMINGO 3,245,097
COLD PRESSING MACHINE
Filed Dec. 13, 1963 5 Sheets-Sheet 3

INVENTOR.
AMADEO FERRE DOMINGO
BY
Karl F. Ross
AGENT

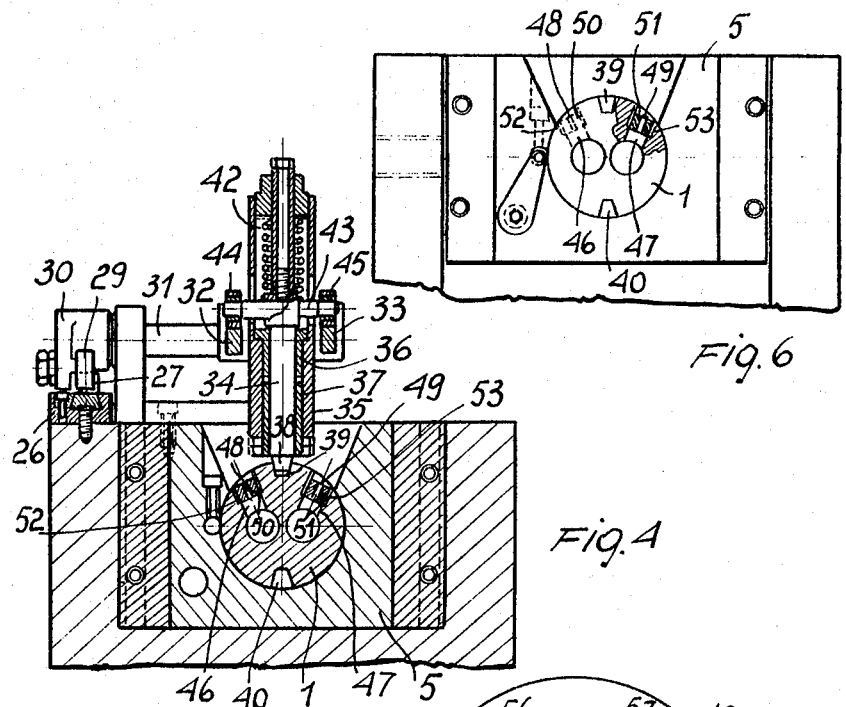
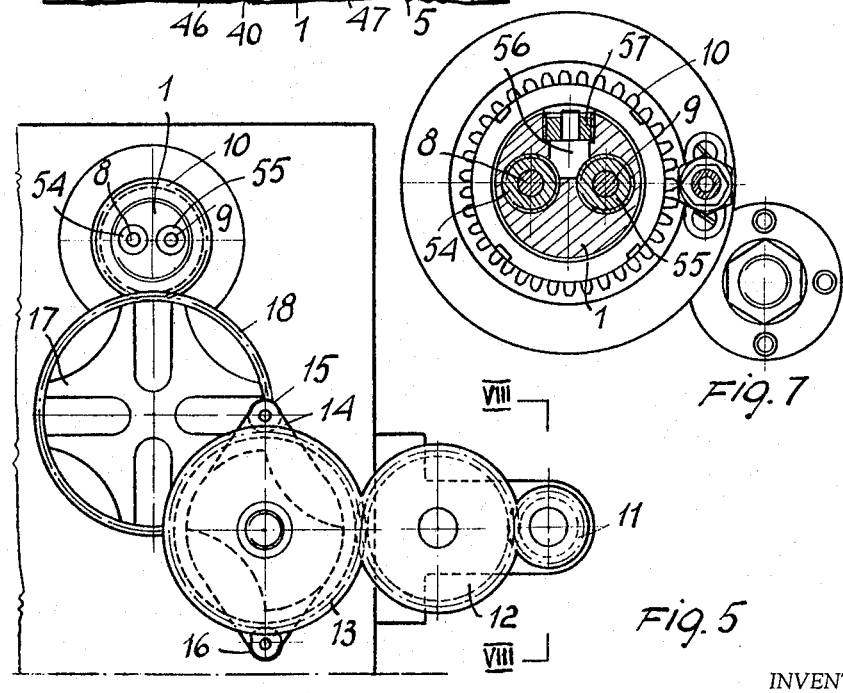

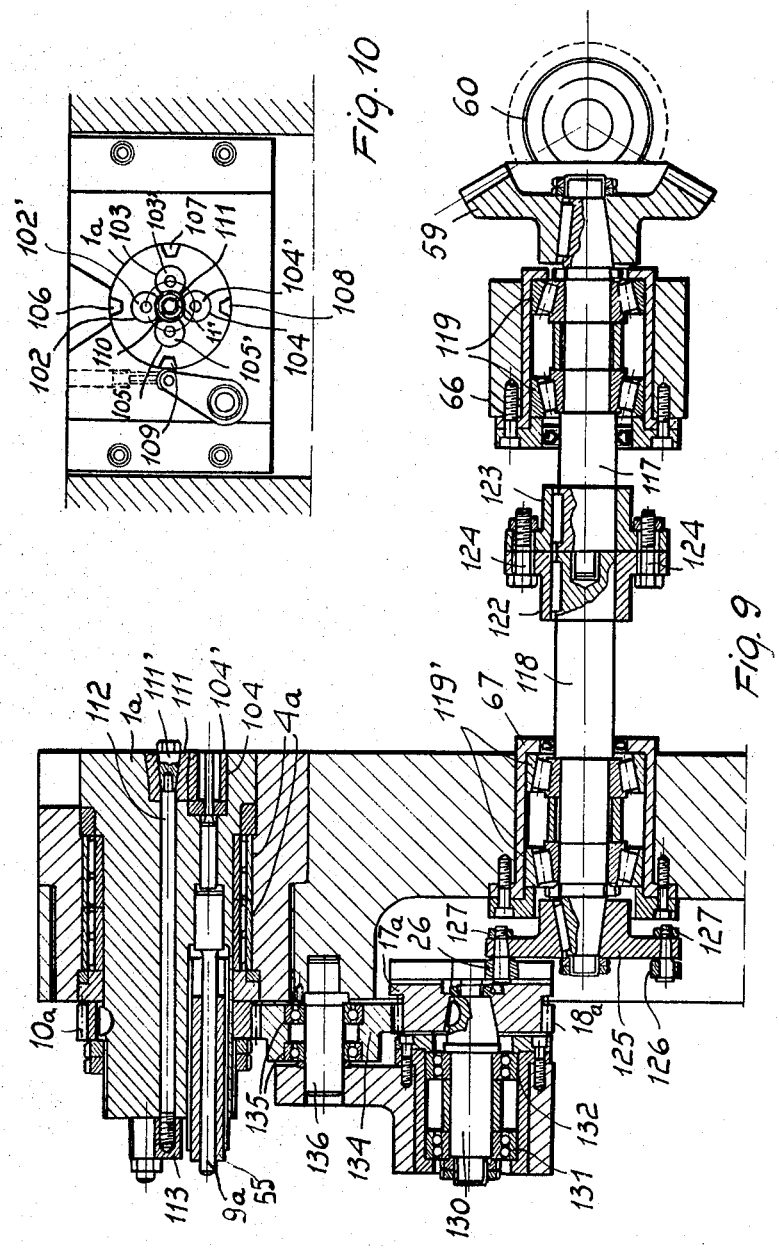

United States Patent Office 3,245,097
Patented Apr. 12, 1966

3,245,097
COLD PRESSING MACHINE
Amadeo Ferre Domingo, Juan Corrales 88,
Esplugas de Llobregat, Spain
Filed Dec. 13, 1963, Ser. No. 330,418
Claims priority, application Spain, Dec. 18, 1962,
283,850
2 Claims. (Cl. 10—13)

This invention relates to cold-pressing machines, particularly cold-pressing machines of the type applicable to the manufacture of screws, riveting elements and similar mechanical parts, in which the manufacturing process starts from a metal rod which is fed to the pressing machine which is provided with suitable means for cutting said metal rod into lengths or blanks and adapted for heading one end of the blanks, in the course of a first and a second shaping stage.

The machines which are known for high-rate production, i.e. pressing of screws and other similar parts, have an organic drawback limiting the manufacturing speed. This drawback is the need for two successive blows of the operative head of the machine to obtain each finished head.

Since the operating speed of said machines is limited by inertia of the reciprocating motion and by the mass of the materials employed for both the shaping and rod-holding dies, the importance of the reduction of time of the manufacturing cycle, so that at each blow of the punch head a finished part will be recognized.

This is, therefore, the main object of this invention which also obviates other inconveniences easily characterizing the well known pressing machine types by eliminating any rotary motion as in conventional machines in which the head has a rotary motion as it swings about its longitudinal axis.

These and other objects are attained by a press according to this invention which comprises mechanical parts so constructed and arranged that at each blow of the machine head the head of at least one of the blanks under manufacture is finished and is characterized in that it comprises a die-holding body, provided with a plurality of dies each receiving a blank, in at least one of such dies the first pressing stage of the blank head is effected and simultaneously in at least one of the remaining dies the same head of another blank being finish machined, further members being provided for producing an intermittent rotary motion of said die-holding body, said motion being suitable to position each of said dies correspondingly to said pressing and finishing stage of the head without giving rise to any rotation of the head provided with die punches.

In the aforesaid machine there is advantageously provided a transmission device, adapted to obtain the actuation of said die-holding body whereby the same is positioned at each rotation correspondingly to the working postions, further means being provided for fastening and locking said die-holding body, to stabilize the positioning thereof.

Further characteristics and advantages of the invention will become more apparent from the following detailed description of a preferred but non-limiting embodiment of a press according to this invention represented in the accompanying drawings, in which:

FIG. 4 is a cross-section along the line IV—IV of FIG. 3 through the die holding block representing the locking mechanism for the die holding block;

FIG. 5 is a detail showing the transmission device for the die holding block;

FIG. 6 is a detail showing the fastening device for the dies;

FIG. 7 is a section along the line VII—VII of FIG. 1, showing the fastening devices for the longitudinal regulation sleeves;

FIG. 9 is a section along the line IX—IX of FIG. 1, showing another embodiment of the machine according to the invention;

FIG. 10 represents a plan view of the die holding block of the embodiment shown in FIG. 9.

Figure 1:
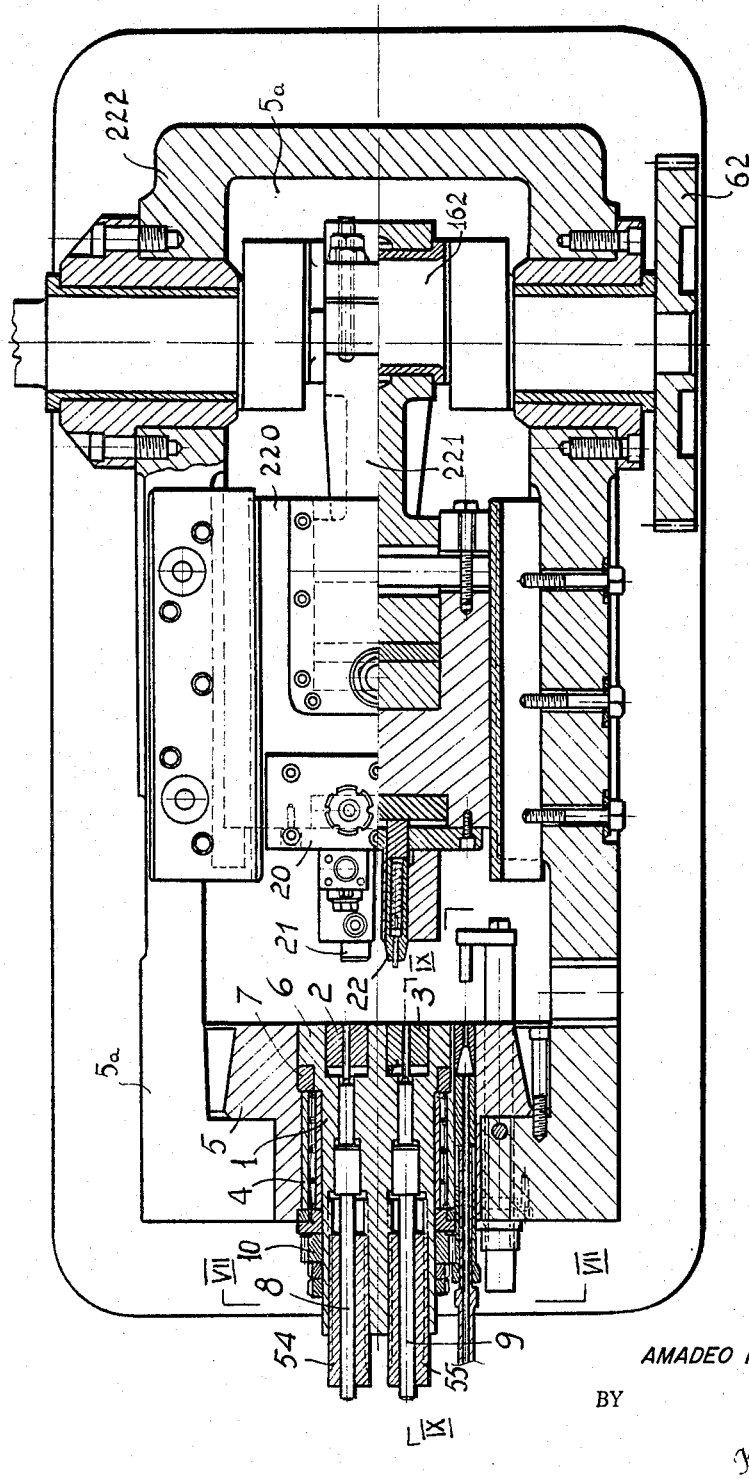
FIG. 1 is a partial longitudinal section along the line I—I of FIG. 3 including the die holding block and the pressing head.
Figure 2:
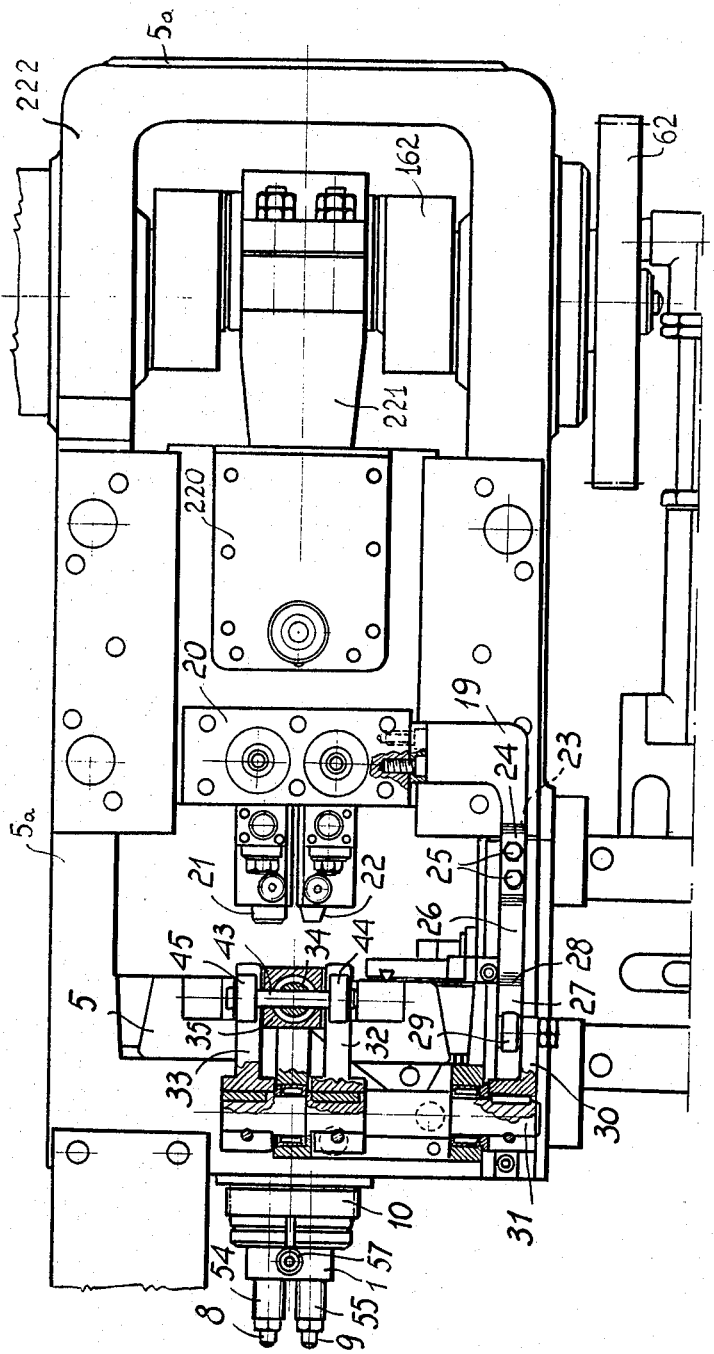
FIG. 2 is a plan view of the front assembly partially in section along line II—II of FIG. 3 and representing the locking device of the die holder.
Figure 3:
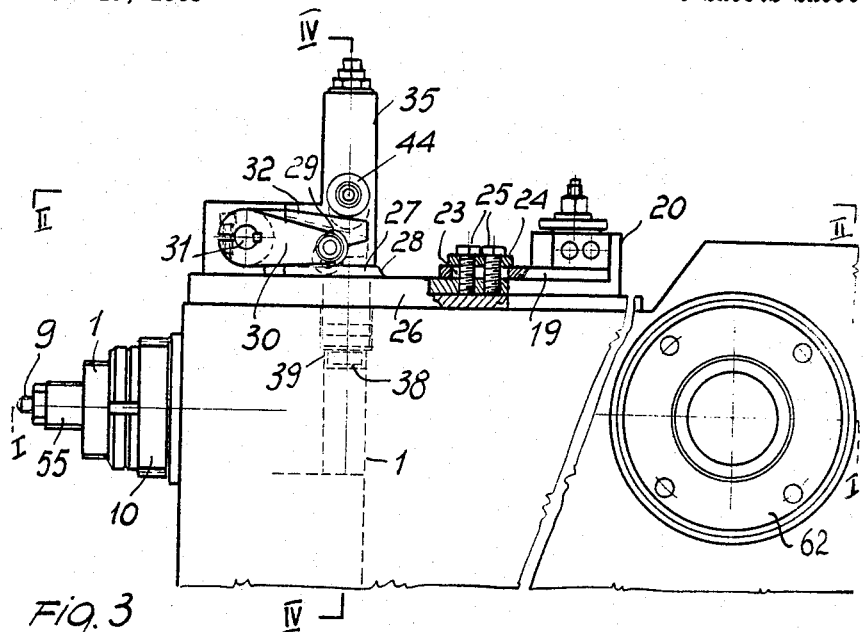
FIG. 3 is a side view showing an operative position of the die-holder-locking device.

Referring now to the FIGS. 1 to 8 where a first preferred embodiment of the machine according to this invention is represented, the die-holding body carries two dies and is adapted to perform a 180° intermittent rotary motion.

It is essential in this machine to provide a die-holding block 1 carrying the heading dies 2 and 3, which are symmetrically arranged with respect to a longitudinal axis of said block 1; the latter is rotatable because of the presence of needle bearing 4 which provides the rotary support of said block 1 with respect to the part 5 constituting the machine frame.

The block 1 engages through its flange-like end 6 with an intermediate abutment ring 7.

Each of the dies 2 and 3 are fitted with an independent ejecting device constituted of guided rods 8 and 9 projecting outwardly with their free ends on which a single lever (not shown) acts by striking the rod of the die when it is in the position in which the work piece is finished, thereby ejecting the finished work piece to the outside.

The actuation of the die-holding block 1 occurs by means of a toothed pinion 10 which is mounted near its left end (FIG. 1) and which is in turn actuated by a gear system as represented in FIG. 5.

Figure 8:
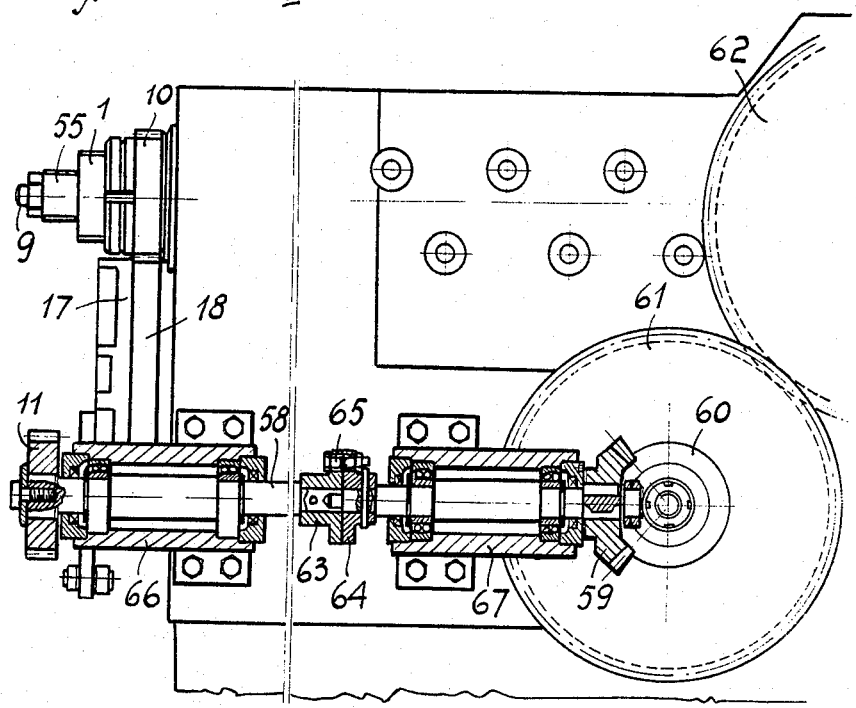
FIG. 8 is a section along the line VIII—VIII of FIG. 5 showing the intermediate actuation shaft of the die holder.

Pinion 11 (FIG. 5) is keyed on an intermediate shaft 58 receiving motion from the crankshaft 162 (FIG. 8).

Pinion 11 is in mesh with an intermediate toothed wheel 12 (FIG. 5) which is in turn in mesh with the toothed wheel 13 which is rigid with the double eccenter part 14 carrying two rollers 15 and 16 which act upon a Maltese cross indexing device 17 which in turn carries a toothed rim 18 in mesh with the pinion 10 keyed on the die holding block 1.

In such a way the intermittent rotation of the die-holding block 1, is obtained; the block rotates intermittently through 180° around its symmetry axis and remains stopped during a short while, corresponding to the working time necessary for allowing the operative action of the head provided with die punches.

The pinion 11 is keyed on the shaft 58 (FIG. 8) receiving the motion at the other end thereof by means of the conical pinions 59 and 60, the latter being fast with the toothed rim 61 in mesh with the toothed wheel 62 mounted on the driving shaft 162 (FIG. 1). The shaft 58 is of the composite type, having two aligned shaft parts connected to one another by means of pegged flange coupling parts 63, 64, connected by means of the bolt 65.

Each of the two parts constituting the shaft 58 are supported by two ball bearings mounted in the casings 66 and 67.

As will be understood the actuating transmission mechanism can be constituted of another transmission whatsoever, capable of obtaining the desired intermittent rotation of the die-holding block with an intermediate stopping period. Thus it will be possible to replace the represented transmission system consisting of a train of meshing pinions with another system such as—for example—a chain transmission with the corresponding sprockets.

In the present invention the arrangement of a locking mechanism for the die holding body 1 ensuring the correct position of said body 1 during the short stopping time during which the pressing operation takes place is essential, said mechanism being constituted of a main arm 19 (FIGS. 2 and 3) which is rigid with the head 20 provided with the punches 21 and 22, said arm being longitudinally adjustable via a slot 23 by means of which a plate member 24 adjustably fixes arm 19 by means of the screws 25, on the extension member 26, provided with cam surface 27 which has an inlet zone 28 and is plane over the remaining length thereof in such a way that the follower roller 29, establishing the contact with the same is at the same height during the period in which it rests upon said plane face.

Said roller 29 is mounted on an arm 30 fixed to shaft 31 (FIG. 2) on which two arms 32 and 33 are fitted, adapted to lift up the stem 34 sliding inside the guide 35 provided with metal sleeves 36 and 37, the stem 34 being provided with an end tooth 38 (FIG. 4) which can be introduced into the cavities 39 and 40 existing in the lateral surface of the die-holding block 1, said cavities being in diametrally opposite position in such a way that the fastening of said die holding block 1 occurs at each 180° rotation thereof around its longitudinal axis. The stem 34 is biased by a spring 42 which tends to keep the tooth 38 inside the cavities 39 and 40. The mechanical contact between the stem 34 and the arms 32 and 33 designed for its actuation, overcoming the action of the spring 42, is established by means of a cross pin 43 crossing said stem and carrying mounted at both ends thereof the rollers 44 and 43 which are in contact with the arms 32 and 33.

By moving away the head 20 and the assembly 220, from the die holding block 1 by means of the connecting rod 221 connected to the driving crank shaft 162 supported by the frame part 222, the arms 19 and 26 fast with said head 20 move likewise away, so that said roller 29 by entering the inlet 28 of the member 27 rises until reaching the flat portion of said element. Correspondingly to said rise there is a counter-clockwise rotation (FIG. 3) of the arm 30 and hence of the shaft 31 fast therewith, so that there also occurs a rise of the arms 32 and 33.

In such manner the rise of the arms is transformed into a displacement of the stem 34 causing the elevation of the tooth 38 from the inside of the cavities 39 and 40 at the moment in which the rotation of the die-holding block 1 starts.

Upon termination of the action of the arms 32 and 33, i.e. when head 20 is shifted forwardly and when the body 1 is correctly positioned, the stem 34 returns to its previous position and the tooth 38 enters the cavity 40 or 39 corresponding to the new working position.

The fastening of the dies occurs as represented in FIG. 6 by means of lateral pressure of the cylindrical blocks 46 and 47 which move in corresponding bores 52, 53 provided in the die-holding block 1 in perpendicular direction to the axis of the respective dies. The fastening blocks 46, 47 are provided with rear stems 48 and 49 which are inserted in corresponding bores of nuts 50 and 51 which are screwed in the end parts of the bores 52 and 53 which have a larger diameter than the bottom part thereof, thus permitting, by screwing in said nuts 50 and 51, to exert an axial force on the blocks 46 and 47 which fixes the respective dies in their position.

The fastening of the limit sleeves 54 and 55 takes place as represented in FIG. 7 in a similar manner as the fastening of the dies. For this purpose a laterally acting block 56 is provided acting simultaneously upon the sleeves 54 and 55 through the action of a rear fastening nut 57 exerting an axial pressure upon said block 56.

In a modified embodiment permitting a relatively simplified operation as well as an increase in the output of the machine according to this invention there is provided a die-holding block having four symmetrically arranged dies, a gear train for the transmission of motion to said die-holding block and fastening and locking devices for said dies of more practical operation and simpler design.

Referring now to FIGS. 9 and 10 representing said modified embodiment, the die-holding block 1a is provided with four symmetrically arranged housings 102, 103, 104, 105 in which there are fitted some interchangeable dies 102′, 103′, 104′, 105′. Through rotation of block 1a the dies may interchange their positions; one of said positions can be designed for the removal of a finished part, generally a screw, a riveted part or similar parts, the other positions being actual working positions.

The die-holding block 1a has four peripheral cavities 106, 107, 108, 109, which are designed to define four stable positions for each 90° rotations of the die holding assembly in cooperation with a locking, similar to that of the previous embodiment.

The fastening of the different dies mounted in the assembly 1a is carried out by means of two expansible half-cones 110, 111, which (FIG. 9) are mounted on the central portion of the assembly 1a and fasten the conical parts, of said dies which are inserted in the sockets provided therefor in the block 1a so that the axial pressure of said half-cones produces the fixing of said dies, the necessary axial pressure being obtained by means of a male conical part 111′ screwed on the end of a tie rod 112 crossing longitudinally the block 1a and which is fastened to the other projecting end by a nut 113. By loosening the nut 113 the tension exerted by the tie rod 112 disappears, so that the different dies may be released and extracted if necessary. The die-holding block 1a is mounted on the needle bearings 4a and carries keyed thereon a toothed wheel 10a for receiving motion from the driving gear. The motion transmission to the die holding assembly occurs by means of two half-shafts 117, 118 which are mounted on pairs of conical rollers 119 and 119′, fitted in the cases 66 and 67, the former of said half-shafts carrying keyed thereon a bevel gear 59 engaging with the driving bevel gear 60. Both half-shafts are connected by means of coupling sleeves 122 and 123 connected to one another by a set of screws 124. The transmission of motion of the half-shaft 118 to the die holding block 1a occurs by placing therebetween a plate 125 carrying the rotary rollers 126 mounted on pins fastened by means of the nuts 127 to their coupling plate 125, said rotary rollers acting inside the grooves of a Maltese cross mechanism 17a, fastened onto the supporting shaft 130 which moves on two double ball bearings 131 and 132.

Said Maltese cross 17a is provided with a toothed rim 18a designed to engage with an intermediate pinion 134 supported, with interpositioning of the ball bearings 135, on the shaft 136 and engaging with the toothed rim 10 fast with the die holding block 1a.

The intermediate block 134 can be eliminated by using a direct transmission connection between toothed rims 18a and 10a thus obtaining the possibility of varying the transmission ratio between the shaft 118 and the die holding assembly.

Both in the first and in the second embodiment the blanks are fed by a feeder of well known type (not shown) which brings the blanks between the dies and the corresponding punch, in alignment therewith, and when the punch advances and begins to press, the blank within the die the feeder retracts swiftly without being touched by the punch.

I claim:
1. In a cold-forging machine for forming heads on bolts and the like, said machine having a frame, a punch head reciprocable on said frame and a rotatable die-holding block on said frame co-operating with said punch head, the combination therewith of a locking mechanism for temporary locking said rotatable die-holding block in certain positions thereof, said locking mechanism comprising: an arm rigid with said punch head; a guide member supported on said frame near said rotatable block; a stem member slidable within said guide member, said rotatable block member being formed with at least one notch in its periphery; and transmission means connected with said stem member and actuable by said arm in one position of said head to allow said stem member to engage within said notch and to lock said block against rotation, and operable in another position of said head to disengage said stem member from said notch and to release said block for further rotation.

2. In a cold-forging machine for forming heads on bolts and the like, said machine having a frame, a punch head reciprocable on said frame and a rotatable die-holding block on said frame co-operating with said punch head, the combination therewith of a locking mechanism for temporary locking said rotatable die-holding block in certain positions thereof, said locking mechanism comprising: a first arm rigid with said punch head; an extension member rigid with said first arm and having a camming portion and a plain portion; fastening means for adjustably fastening said extension member on said first arm; a shaft supported on said frame perpendicularly to the direction of reciprocation of said reciprocable punch head; a second arm rigid with said shaft and adapted to co-operate with said extension member; a guide member supported on said frame near said rotatable block; a stem member perpendicular to the axis of rotation of said rotatable block member slidable within said guide member, spring means urging said stem member towards said rotatable block member; at least one third arm rigid with said shaft and having an end portion thereof engaging said stem member, said block being peripherally formed with at least one notch, said extension member being disposed to actuate said second arm with said cam portion when said reciprocable punch head is in a position remote from said rotatable block thereby imparting a first angular movement to said second arm, said shaft and said third arm to move said stem member away from said rotatable block and said extension member actuating said second arm with said plain portion thereof when said reciprocable punch head is in a position near to said rotatable block thereby allowing said second arm, said shaft and said third arm to perform an angular movement opposite to said first angular movement and said spring means to move said stem member into said notch of said rotatable block member.

References Cited by the Examiner
UNITED STATES PATENTS

| | | | |
|---|---|---|---|
| 53,531 | 3/1866 | Hall et al. | 10—13 |
| 383,083 | 5/1888 | Whiteley et al. | 10—13 |
| 1,148,245 | 7/1915 | Martin et al. | 10—13 |
| 1,637,107 | 7/1927 | Dwyer et al. | 10—13 |
| 2,431,279 | 11/1947 | Remington et al. | 10—13 |
| 2,664,579 | 1/1954 | Akey | 10—13 |

WILLIAM W. DYER, Jr., *Primary Examiner.*

F. T. YOST, *Assistant Examiner.*